United States Patent
Lee et al.

(10) Patent No.: US 10,884,497 B2
(45) Date of Patent: Jan. 5, 2021

(54) METHOD AND APPARATUS FOR MOTION CAPTURE INTERFACE USING MULTIPLE FINGERS

(71) Applicant: Center of Human-Centered Interaction for Coexistence, Seoul (KR)

(72) Inventors: Dong Myoung Lee, Seoul (KR); Mincheol Kim, Seoul (KR); Juseong Lee, Seoul (KR); Bum Jae You, Seoul (KR)

(73) Assignee: Center of Human-Centered Interaction for Coexistence

( * ) Notice: Subject to any disclaimer, the term of this patent is extended or adjusted under 35 U.S.C. 154(b) by 0 days.

(21) Appl. No.: 16/695,545

(22) Filed: Nov. 26, 2019

(65) Prior Publication Data
US 2020/0166999 A1 May 28, 2020

(30) Foreign Application Priority Data
Nov. 26, 2018 (KR) .................. 10-2018-0147647

(51) Int. Cl.
| | |
|---|---|
| *G06F 3/01* | (2006.01) |
| *G06T 7/00* | (2017.01) |
| *G06T 15/20* | (2011.01) |
| *G06T 17/00* | (2006.01) |
| *G06F 3/0482* | (2013.01) |
| *G06F 3/03* | (2006.01) |
| *G06T 7/60* | (2017.01) |
| *G06F 3/042* | (2006.01) |

(52) U.S. Cl.
CPC .............. *G06F 3/014* (2013.01); *G06F 3/017* (2013.01); *G06F 3/01* (2013.01); *G06F 3/0304* (2013.01); *G06F 3/0425* (2013.01); *G06F 3/0482* (2013.01); *G06T 7/60* (2013.01); *G06T 15/20* (2013.01); *G06T 17/00* (2013.01)

(58) Field of Classification Search
CPC . G06F 3/01; G06F 3/014; G06F 3/017; G06F 3/0304; G06F 3/0425; G06F 3/04842; G06F 21/32; G06K 9/00033; G06K 9/00375; G06K 9/00362; G06K 9/00885; G06K 2009/00395; G06K 2209/055; G06T 7/60; G06T 15/20; G06T 17/00; G06T 19/00; G06T 2200/08; G06T 2207/20081
See application file for complete search history.

(56) References Cited

U.S. PATENT DOCUMENTS

| | | | | |
|---|---|---|---|---|
| 4,986,280 | A * | 1/1991 | Marcus | ........... A61B 5/103 33/512 |
| 10,281,987 | B1 * | 5/2019 | Yang | ........... G06F 3/0304 |

(Continued)

*Primary Examiner* — Michael J Eurice
(74) *Attorney, Agent, or Firm* — Harness, Dickey & Pierce, P.L.C.

(57) ABSTRACT

A method and apparatus for motion capture interface using multiple fingers are disclosed. The method includes measuring a position of an end of a middle finger of an actual hand in a state in which the actual hand is spread, deriving a starting reference position of the middle finger of the actual hand, and calculating a length of the middle finger of the actual hand. The method further includes recognizing a relationship between starting reference positions of a thumb, an index finger, a middle finger, and a wrist based on using a virtual hand reference model that models a virtual hand to be controlled.

9 Claims, 6 Drawing Sheets

(56) References Cited

U.S. PATENT DOCUMENTS

| | | | | |
|---|---|---|---|---|
| 10,635,172 B1* | 4/2020 | Keller | G01B 7/004 |
| 2007/0201727 A1* | 8/2007 | Birrell | A63B 71/0697 |
| | | | 382/115 |
| 2008/0260214 A1* | 10/2008 | Hauke | G06K 9/00033 |
| | | | 382/124 |
| 2011/0043475 A1* | 2/2011 | Rigazio | G08C 17/00 |
| | | | 345/173 |
| 2012/0030928 A1* | 2/2012 | Park | G06Q 30/0621 |
| | | | 29/592 |
| 2012/0117514 A1* | 5/2012 | Kim | G06F 3/011 |
| | | | 715/849 |
| 2012/0308140 A1* | 12/2012 | Ambrus | G06K 9/00362 |
| | | | 382/190 |
| 2013/0155070 A1* | 6/2013 | Luo | G06T 19/00 |
| | | | 345/441 |
| 2013/0158946 A1* | 6/2013 | Scherberger | G06F 17/00 |
| | | | 702/151 |
| 2013/0329011 A1* | 12/2013 | Lee | G06T 19/20 |
| | | | 348/46 |
| 2015/0084884 A1* | 3/2015 | Cherradi El Fadili | G06F 3/0233 |
| | | | 345/173 |
| 2015/0100910 A1* | 4/2015 | Luo | G06F 3/04886 |
| | | | 715/771 |
| 2015/0153832 A1* | 6/2015 | Krepec | G06F 3/017 |
| | | | 345/157 |
| 2015/0169176 A1* | 6/2015 | Cohen | G06F 3/04845 |
| | | | 715/852 |
| 2015/0256815 A1* | 9/2015 | Grafulla-Gonzalez | G06F 3/011 |
| | | | 348/46 |
| 2015/0324001 A1* | 11/2015 | Yanai | G06T 7/70 |
| | | | 345/156 |
| 2015/0347833 A1* | 12/2015 | Robinson | G01B 11/25 |
| | | | 348/77 |
| 2016/0180142 A1* | 6/2016 | Riddle | G06K 9/00375 |
| | | | 382/124 |
| 2016/0210780 A1* | 7/2016 | Paulovich | G02B 27/0172 |
| 2016/0267340 A1* | 9/2016 | Jensen | G06K 9/00885 |
| 2016/0370861 A1* | 12/2016 | Ikeda | G06K 9/2036 |
| 2017/0147075 A1* | 5/2017 | Lerner | G06F 3/017 |
| 2018/0110497 A1* | 4/2018 | Beacham | B33Y 80/00 |
| 2018/0267653 A1* | 9/2018 | Holman | G06F 3/044 |
| 2018/0335843 A1* | 11/2018 | Erivantcev | A63F 13/211 |
| 2018/0336733 A1* | 11/2018 | Koga | G06T 19/006 |
| 2019/0180473 A1* | 6/2019 | Guleryuz | G06T 5/002 |
| 2020/0103961 A1* | 4/2020 | Wang | G06T 7/70 |

* cited by examiner ered from the following detailed description when taken in conjunction with the accompanying drawings, in which:

METHOD AND APPARATUS FOR MOTION CAPTURE INTERFACE USING MULTIPLE FINGERS

CROSS-REFERENCE TO RELATED APPLICATION

This application claims priority to and the benefit of Korean Patent Application No. 10-2018-0147647, filed on Nov. 26, 2018, the disclosure of which is incorporated herein by reference in its entirety.

BACKGROUND

The present invention relates to a method and apparatus for motion capture interface using multiple fingers.

The information disclosed in this Background section is only for enhancement of understanding of the background of the invention and therefore it may contain information that does not form the prior art.

Along with development of technologies, interest in virtual reality or augmented reality has increased. In virtual reality, all of an image, a surrounding background, and an object are configured and shown in the form of a virtual image, and on the other hand, in augmented reality, the real world is mainly shown and only additional information is virtually configured and overlaid on the real world. Both virtual reality and augmented reality need to make a user who uses the same feel as though they are interacting with a virtual object. In this regard, a hand motion capture apparatus for tracking hand motion of a user recognizes a user's hand well, even in any environment and provides realistic experiences in various situations.

Technology for measuring finger motion of a user and applying the finger motion of the user to virtual reality or augmented reality includes technologies for measuring finger motion using a glove and an exoskeleton with a bending sensor, a potentiometer, or the like and a system for tracking a finger with an optical marker attached thereto via a camera. However, the system for tracking a finger with an optical marker attached thereto via a camera requires an external camera system and has a problem in terms of overlapping and hiding of the optical marker. In addition, the technology for measuring finger motion using a glove and an exoskeleton with a bending sensor, a potentiometer, or the like is not capable of precise measurement, and when an image or an infrared sensor is used, there is a problem in that it is possible to measure only motion within a visual field and a measurement value is not accurate due to overlapping between fingers or overlapping between a hand and a finger.

In addition, various hand motion capture apparatuses such as a motion tracker system for emitting an infrared ray to a reflective target disposed on a finger and detecting the reflected infrared ray, a hand interface using an optical finger joint sensor, a pneumatic air pocket, or a pneumatic muscle actuator have been developed.

SUMMARY OF THE INVENTION

Therefore, the present invention has been made in view of the above problems, and it is an aspect of the present invention to provide a method and apparatus for motion capture interface using multiple fingers, which is used in virtual reality or augmented reality.

In accordance with a preferred embodiment of the present invention, the above and other aspects can be accomplished by the provision of a motion capture interface method using multiple fingers. The method includes measuring a position of an end of a middle finger of an actual hand in a state in which the actual hand is spread, deriving a starting reference position of the middle finger of the actual hand, and calculating a length of the middle finger of the actual hand. The method further includes recognizing a relationship between starting reference positions of a thumb, an index finger, a middle finger, and a wrist based on using a virtual hand reference model that models a virtual hand to be controlled. The method still further includes calculating a length ratio of the middle finger between the actual hand and the virtual hand reference model, and calculating starting reference positions of the thumb, the index finger, and the wrist of the actual hand using the recognized relationship between the starting reference positions and the length ratio of the middle finger. The method still further includes measuring positions of ends of the thumb and the index finger of the actual hand and calculating lengths of the thumb and the index finger of the actual hand. The method still further includes calculating lengths of links between finger joints of each of the thumb, the index finger, and the middle finger of the virtual hand using a length ratio of the thumb, the index finger, and the middle finger between the virtual hand reference model and the actual hand. The method still further includes controlling the virtual hand based on the calculated lengths of links of the actual hand and a real-time measured position of the end of each of the thumb, the index finger, and the middle finger of the actual hand.

In accordance with an aspect of the present invention, the above and other aspects can be accomplished by the provision of a motion capture interface apparatus using multiple fingers, the apparatus including a measurement unit and a controller. The measurement unit is configured to measure a position of an end of each of a thumb, an index finger, and a middle finger of an actual hand. The controller is configured to derive a starting reference position of the middle finger of the actual hand, measured in a state in which the actual hand is spread, and calculate a length of the middle finger of the actual hand. The controller is further configured to recognize a relationship between starting reference positions of a thumb, an index finger, a middle finger, and a wrist using a virtual hand reference model that models a virtual hand to be controlled, and calculate a length ratio of the middle finger between the actual hand and the virtual hand reference model. The controller is still further configured to calculate starting reference positions of the thumb, the index finger, and the wrist of the actual hand using the recognized relationship between the starting reference positions and the length ratio of the middle finger, measure positions of ends of the thumb and the index finger of the actual hand, and calculate lengths of the thumb and the index finger of the actual hand. The controller is still further configured to calculate lengths of links between finger joints of each of the thumb, the index finger and the middle finger of the virtual hand using based on a length ratio of the thumb, the index finger, and the middle finger between the virtual hand reference model and the actual hand. The controller is still further configured to control the virtual hand reference model based on the calculated lengths of links of the virtual hand and a real-time measured position of the end of each of the thumb, the index finger, and the middle finger of the actual hand.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
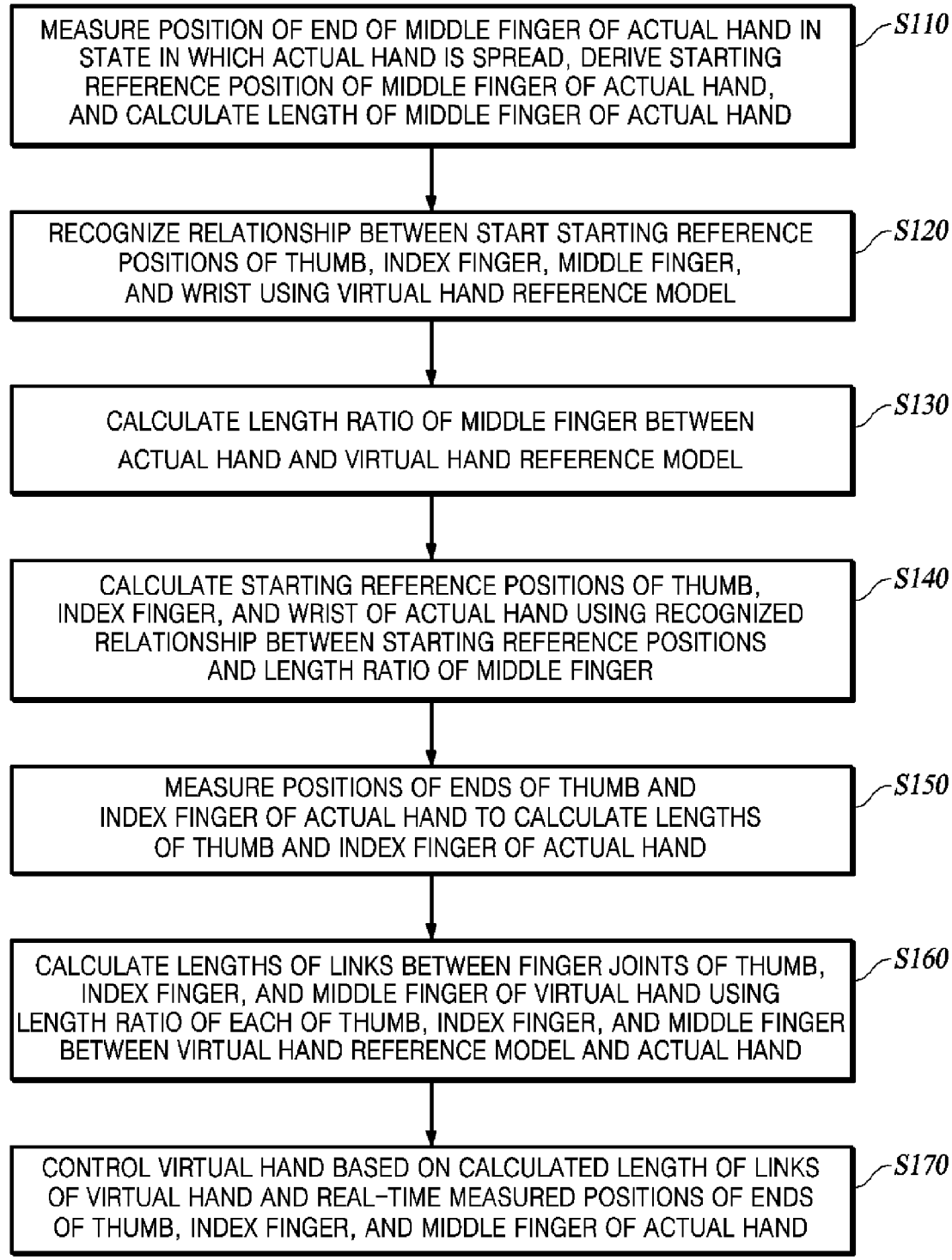
FIG. 1 is a flowchart of a method for motion capture interface using three fingers according to the present disclosure.

Hereinafter, at least one embodiment of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for clarity and brevity.

It will be understood that, although the terms first, second, A, B, (a), (b), etc. may be used herein to describe various elements of the present invention, these terms are only used to distinguish one element from another element and necessity, order, or sequence of corresponding elements are not limited by these terms. Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

In virtual reality or augmented reality, a user may interact with a virtual object using various methods. The user may interact with a virtual object using an instrument or may interact directly with the virtual object using a user body. The user may mainly use the hand among body parts, and when a hand is used other than other body parts, various interactions may be possible. However, in the case of a hand, fingers operate separately or integrally and move variously, and thus, it is much difficult to recognize detailed hand motion and to apply the motion to virtual reality or augmented reality.

The specification discloses a method and apparatus for motion capture interface using multiple fingers, and a method and apparatus for motion capture interface using multiple fingers, for example, three fingers of a thumb, an index finger, and a middle finger will be described.

FIG. 1 is a flowchart of a method for motion capture interface using three fingers according to the present disclosure.

First, a position of an end of a middle finger of an actual hand may be measured in a state in which the actual hand is spread, and a starting reference position of the middle finger may be derived and a length of the middle finger may be calculated (S110). Here, the starting reference position of the finger may correspond to a position of a joint between a finger and a palm.

Figure 2A:
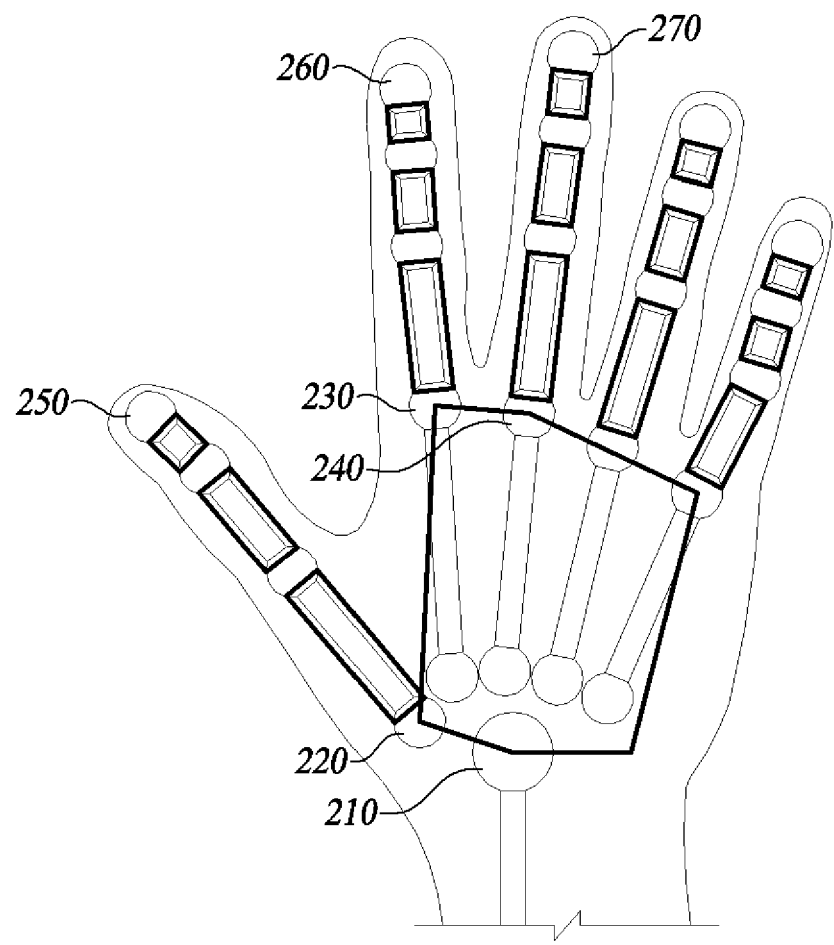
FIG. 2A and FIG. 2B show starting reference positions and ends of a thumb, an index finger, and a middle finger, and a starting reference position of a wrist according to an example of the present disclosure.
Figure 2B:
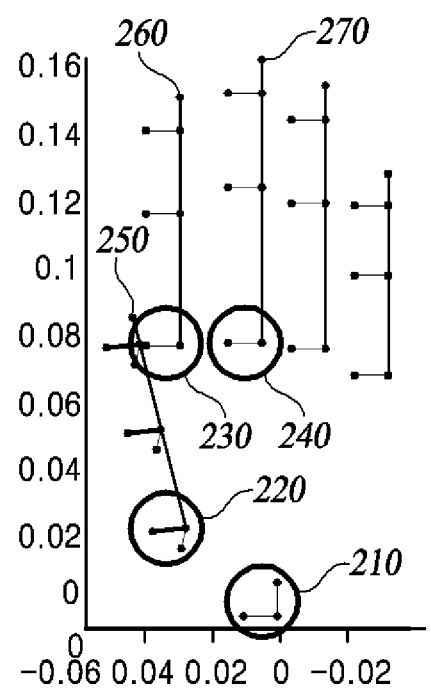

FIG. 2A and FIG. 2B show starting reference positions and ends of the thumb, the index finger, and the middle finger, and a starting reference position of a wrist according to an example of the present disclosure. In detail, FIG. 2A shows starting reference positions 220, 230, and 240 and ends 250, 260, and 270 of the thumb, the index finger, and the middle finger, and a starting reference position 210 of a modeled hand, i.e., a virtual hand reference model. FIG. 2B shows the starting reference positions 220, 230, and 240 of the respective fingers, joints, and the ends 250, 260, and 270 based on the starting reference position 210 of the wrist of the virtual hand reference model.

Figure 3A:
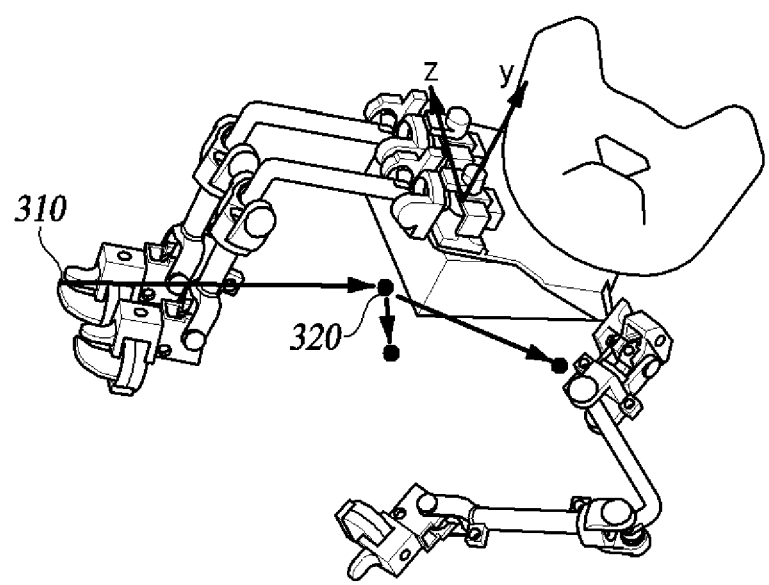
FIG. 3A and FIG. 3B show an example of an apparatus for acquiring a starting reference position of a middle finger of an actual hand according to the present disclosure.
Figure 3B:
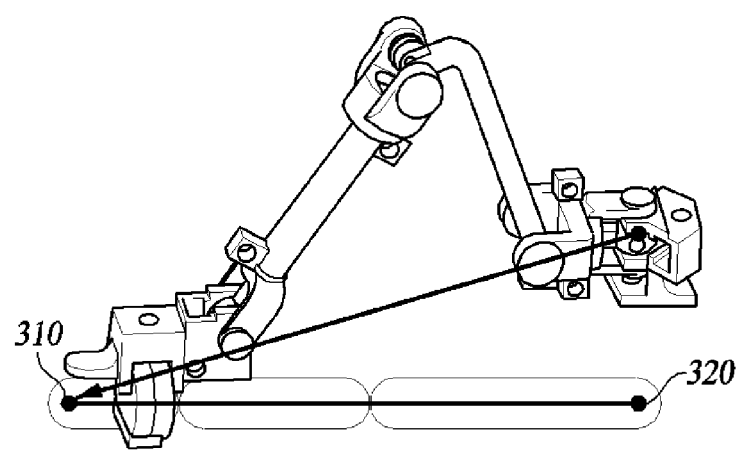

FIG. 3A and FIG. 3B show an example of an apparatus for acquiring a starting reference position of a middle finger of an actual hand according to the present disclosure.

FIG. 3A illustrates the entire configuration of the apparatus. FIG. 3B shows only the configuration for acquiring the starting reference position of the middle finger of the actual hand according to the present disclosure. The apparatus may be put on ends of three fingers, that is, the thumb, the index finger, and the middle finger based on the back of a hand. A sensor may be positioned at an end of each finger and may measure a relative position based on a specific point. A point of a position of an end 310 of the middle finger, which is projected to the y-z plane in a state in which all fingers are spread, may be determined as a starting reference position 320 of the middle finger. Then, a calculated distance between the starting reference position 320 and the end 310 of the middle finger may be the length of the middle finger.

Although FIG. 3A and FIG. 3B exemplify an apparatus with a complicated configuration, the present disclosure may also be applied using a measurement method using a sensor attached to an end of a finger.

Referring back to FIG. 1, a relationship between starting reference positions of the thumb, the index finger, the middle finger, and the wrist may be recognized using a virtual hand reference model that models or specifies a virtual hand to be controlled (S120). In detail, positional values of the starting reference positions of the thumb, the index finger, the middle finger, and the wrist in the virtual hand reference model may be recognized, and a correlation between the starting reference positions may be derived based on the positional values according to a mathematical expression. For example, the correlation may correspond to a length ratio of each starting reference position to the starting reference position of the wrist of the virtual hand reference model. Alternatively, the correlation may correspond to a length ratio of each starting reference position to the starting reference position of the middle finger of the virtual hand reference model.

A length ratio of a middle finger between the actual hand and the virtual hand reference model may be calculated (S130).

In general, motion of a middle finger is relatively small compared with other fingers, and thus, the length ratio of the middle finger may be used and only the length ratio of the middle finger is not necessarily used.

Starting reference positions of the thumb, the index finger, and the wrist of the actual hand may be calculated using the recognized relationship between the starting reference positions and the length ratio of the middle finger (S140).

Assuming that a length ratio between starting reference positions of the virtual hand reference model and a length ratio between starting reference positions of the actual hand are the same, positions of the starting reference positions of the thumb, the index finger, and the wrist of the actual hand may be calculated using the calculated length ratio of the middle finger and the recognized relationship between starting reference positions. It may be seen that, since the starting reference positions of the middle finger and the index finger of the actual hand have the same axis direction, the middle finger and the index finger are to be bent in the same direction, but an axis direction of the starting reference position of the thumb of the actual hand is rotated in a specific direction. Accordingly, a rotation matrix may be applied based on the starting reference position of the middle finger, which is a reference of a coordinate system, to derive the starting reference position of the thumb. The rotation matrix may be a matrix that is predetermined using a virtual hand reference model.

Positions of ends of the thumb and the index finger of the actual hand may be measured to calculate the lengths of the thumb and the index finger of the actual hand (S150).

Like the middle finger of the actual hand, straight distances between positions of the ends of the thumb and the index finger of the actual hand and the starting reference positions of the calculated thumb and index finger of the actual hand may be calculated to calculate the length of the thumb and the index finger of the actual hand.

Lengths of links between finger joints of the thumb, the index finger, and the middle finger of the virtual hand may be calculated using a length ratio of each of the thumb, the index finger, and the middle finger between the virtual hand reference model and the actual hand (S160).

In detail, a length ratio of each of the thumb, the index finger, and the middle finger between the virtual hand reference model and the actual hand may be calculated, and lengths of the thumb, the index finger, and the middle finger of the virtual hand may be calculated using each the calculated ratio of fingers.

Lastly, the thumb, the index finger, and the middle finger of the virtual hand may be controlled based on the calculated lengths of links and real-time measured positions of the ends of the thumb, the index finger, and the middle finger of the actual hand (S170).

Although FIG. 1 exemplifies only the thumb, the index finger, and the middle finger, the same method as in the index finger may also be applied to a ring finger and/or a little finger. That is, the lengths of the links between finger joints of the ring finger and/or the little finger of the virtual hand may be calculated using both a length of each finger calculated by measuring positions of the ends of the ring finger and/or the little finger of the actual hand and a length ratio of each of the ring finger and/or the little finger of the virtual hand reference model. Then, the ring finger and/or the little finger of the virtual hand may be controlled based on the calculated lengths of links of each of the ring finger and/or the little finger of the virtual hand and the measured position of an end of each of the ring finger and/or the little finger of the actual hand. In addition, as necessary, the present disclosure may be applied only to the thumb and the index finger except for the middle finger.

Although FIG. 1 illustrates the case in which operations 110 to 170 are sequentially performed, this is a merely example of an embodiment of the present invention. In other words, it would be obvious to one of ordinary skill in the art that the embodiment is changed and modified in various ways, for example, an order illustrated in FIG. 1 is changed or one or more of operations 110 to 170 are performed in parallel to each other, and thus, FIG. 1 is not limited to the time-series order.

The procedures shown in FIG. 1 can also be embodied as computer readable code stored on a computer readable recording medium. The computer readable recording medium is any data storage device that can store data which can thereafter be read by a computer. That is, examples of the computer-readable recording medium include a magnetic storage medium (e.g., a read-only memory (ROM), a random-access memory (RAM), a floppy disk, or a hard disk), an optical reading medium (e.g., a compact disc (CD)-ROM or a digital versatile disc (DVD)), and carrier waves (e.g., transmission via the Internet). The computer-readable recording medium may be distributed over network coupled computer systems so that the computer-readable code may be stored and executed in a distributed fashion.

Figure 4:
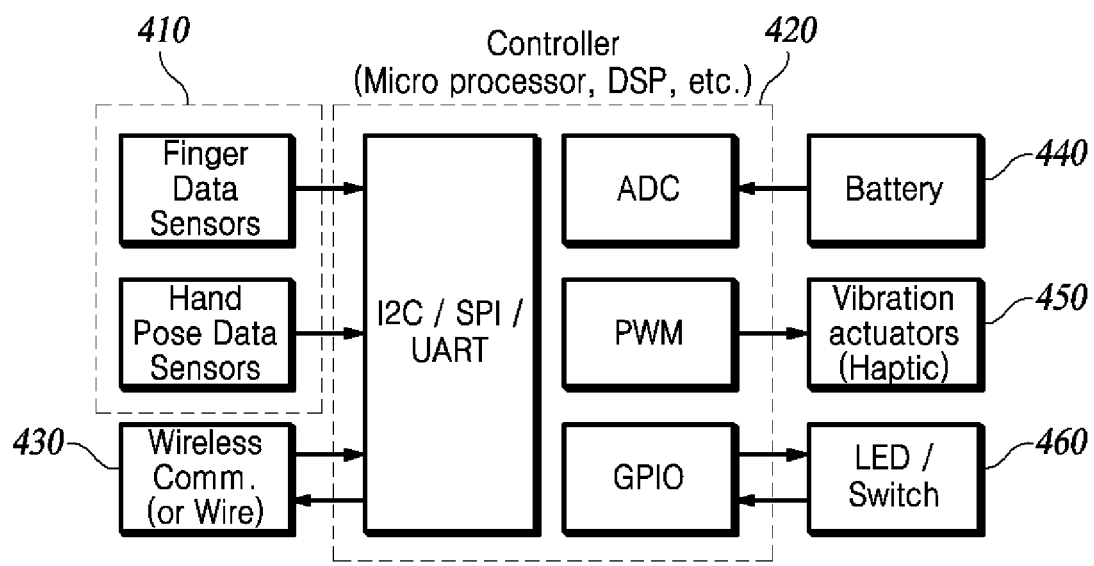
FIG. 4 is a diagram showing the configuration of a motion capture interface apparatus using multiple fingers according to the present disclosure.

FIG. 4 is a diagram showing the configuration of a motion capture interface apparatus using multiple fingers according to the present disclosure.

Although FIG. 4 illustrates a plurality of separate components, various components may be integrally implemented as one component or one component may be divided into a plurality of elements.

The motion capture interface apparatus using multiple fingers may include a measurement unit 410 and a controller 420.

The measurement unit 410 may include finger data sensors, hand pose data sensors, and so on. Positions of the ends of the thumb, the index finger, and the middle finger of the actual hand may be measured. The positions of the ends of the thumb, the index finger, and the middle finger of the actual hand may each be a relative position based on a specific point. The measurement unit 410 may include a sensor(s) for measuring positions of the ends of the thumb, the index finger, and the middle finger of the actual hand. For example, an absolute encoder, a 3D magnetic sensor, and so on may be used to measure an angle of a joint of a finger, and an inertial measurement unit (IMU) or the like may be used to measure a pose based on a hand position or orientation.

The controller 420 may include an inter integrated circuit (I2C)/serial peripheral interface (SPI)/universal asynchronous receiver-transmitter (UART), an analog digital converter (ADC), a pulse width modulator (PWM), general-purpose input/output (GPIO), and the like.

The controller 420 may derive a starting reference position of the middle finger of the actual hand from the measured position of an end of the middle finger of the actual hand. The position of an end of the middle finger is measured in a state in which the actual hand is spread. The controller 420 may calculate the length of the middle finger of the actual hand based on the measured position of an end of the middle finger of the actual hand and the derived the starting reference position of the middle finger of the actual hand.

The controller 420 may recognize a relationship between starting reference positions of the thumb, the index finger, the middle finger, and the wrist using the virtual hand reference model.

The controller 420 may calculate a length ratio of the middle finger between the actual hand and the virtual hand reference model. The controller 420 may further calculate the starting reference positions of the thumb, the index finger, and the wrist using the recognized relationship between the starting reference positions and the length ratio of the middle finger.

The controller 420 may measure the positions of the ends of the thumb and the index finger of the actual hand and may calculate the lengths of the thumb and the index finger of the actual hand. The controller 420 may further calculate the lengths of links between finger joints of each of the thumb, the index finger, and the middle finger of the virtual hand using a length ratio of each of the thumb, the index finger, and the middle finger between the virtual hand reference model and the actual hand.

The controller 420 may control the virtual hand based on the calculated lengths of links between finger joints of the virtual hand and the real-time measured positions of the ends of the thumb, the index finger, and the middle finger of the actual hand. The controller 420 may further apply a rotation matrix to the calculated starting reference position, to the thumb of the actual hand.

Optionally, a display unit (not shown) may also be included in the motion capture interface apparatus and the display unit may show the virtual hand to which motion of the actual hand is applied, to a user.

In addition, as necessary, the motion capture interface apparatus using multiple fingers may include a communication unit 430, a battery 440, a vibration actuator 450, a light emitting diode (LED)/switch 460, and the like.

As apparent from the above description of the present embodiment, it may be possible to more accurately interact with a virtual object in virtual reality or augmented reality using a motion capture interface using multiple fingers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motion capture interface method using multiple fingers, the method comprising:
    measuring a position of an end of a middle finger of an actual hand in a state in which the actual hand is spread, deriving a starting reference position of the middle finger of the actual hand, and calculating a length of the middle finger of the actual hand;
    recognizing a relationship between starting reference positions of a thumb, an index finger, a middle finger, and a wrist using a virtual hand reference model that models a virtual hand to be controlled;
    calculating a length ratio of the middle finger between the actual hand and the virtual hand reference model;
    calculating starting reference positions of the thumb, the index finger, and the wrist of the actual hand using the recognized relationship between the starting reference positions and the length ratio of the middle finger;
    measuring positions of ends of the thumb and the index finger of the actual hand and calculating lengths of the thumb and the index finger of the actual hand;
    calculating lengths of links between finger joints of each of the thumb, the index finger, and the middle finger of the virtual hand using a length ratio of the thumb, the index finger, and the middle finger between the virtual hand reference model and the actual hand; and
    controlling the virtual hand based on the calculated lengths of links of virtual hand and a real-time measured position of the end of each of the thumb, the index finger, and the middle finger of the actual hand.

2. The method according to claim 1, wherein the measured position of the end of each of the thumb, the index finger, and the middle finger of the actual hand is a relative position based on a specific point.

3. The method according to claim 1, further comprising applying a rotation matrix to the calculated starting reference position of the thumb of the actual hand.

4. The method according to claim 1, wherein the relationship between the starting reference positions of the thumb, the index finger, the middle finger, and the wrist using the virtual hand reference model is a length ratio based on the starting reference position of the wrist of the virtual hand reference model.

5. A motion capture interface apparatus using multiple fingers, the apparatus comprising:
    a measurement unit configured to measure a position of an end of each of a thumb, an index finger, and a middle finger of an actual hand; and
    a controller configured:
        to derive a starting reference position of the middle finger of the actual hand, measured in a state in which the actual hand is spread;
        to calculate a length of the middle finger of the actual hand;
        to recognize a relationship between starting reference positions of a thumb, an index finger, a middle finger, and a wrist using a virtual hand reference model that models a virtual hand to be controlled;
        to calculate a length ratio of the middle finger between the actual hand and the virtual hand reference model;
        to calculate starting reference positions of the thumb, the index finger, and the wrist of the actual hand using the recognized relationship between the starting reference positions and the length ratio of the middle finger;
        to measure positions of ends of the thumb and the index finger of the actual hand, to calculate lengths of the thumb and the index finger of the actual hand;
        to calculate lengths of links between finger joints of each of the thumb, the index finger, and the middle finger of the virtual hand using a length ratio of the thumb, the index finger, and the middle finger between the virtual hand reference model and the actual hand; and
        to control the virtual hand reference model based on the calculated lengths of links of the virtual hand and a real-time measured position of the end of each of the thumb, the index finger, and the middle finger of the actual hand.

6. The apparatus according to claim 5, wherein the measured position of the end of each of the thumb, the index finger, and the middle finger of the actual hand is a relative position based on a specific point.

7. The apparatus according to claim 5, wherein the controller further applies a rotation matrix to the calculated starting reference position of the thumb of the actual hand.

8. The apparatus according to claim 5, wherein the relationship between the starting reference positions of the thumb, the index finger, the middle finger, and the wrist using the virtual hand reference model is a length ratio based on the starting reference position of the wrist of the virtual hand reference model.

9. The apparatus according to claim 5, further comprising a display unit configured to show the virtual hand.

* * * * *